US010170913B2

(12) United States Patent
Shurina et al.

(10) Patent No.: US 10,170,913 B2
(45) Date of Patent: Jan. 1, 2019

(54) STATIC SYNCHRONOUS COMPENSATOR DEVICE AND RELATED METHOD OF PHASE BALANCING A THREE-PHASE POWER SYSTEM

(71) Applicant: Mitsubishi Electric Power Products, Inc., Warrendale, PA (US)

(72) Inventors: George Steve Shurina, Cheswick, PA (US); Kevin Justin Goldstein, Allison Park, PA (US); Christopher Lee, Johnstown, PA (US); Michael J. Fleming, Pittsburgh, PA (US); Michael Albert Fuchs, Allison Park, PA (US)

(73) Assignee: Mitsubishi Electric Power Products, Inc., Warrendale ( * ) Notice: Subject to any disclaimer, the term of this patent is extended or adjusted under 35 U.S.C. 154(b) by 247 days.

(21) Appl. No.: 15/363,033

(22) Filed: Nov. 29, 2016

(65) Prior Publication Data

US 2018/0152021 A1    May 31, 2018

(51) Int. Cl.
*H02M 1/08* (2006.01)
*H02J 3/18* (2006.01)
*H02M 1/00* (2006.01)
*H02M 5/22* (2006.01)
*H02M 5/257* (2006.01)

(52) U.S. Cl.
CPC ............. *H02J 3/1857* (2013.01); *H02M 1/08* (2013.01); *H02M 5/22* (2013.01); *H02M 5/2573* (2013.01); *H02M 2001/0003* (2013.01); *H02M 2001/0009* (2013.01)

(58) Field of Classification Search
CPC ........ H02M 1/08; H02M 5/22; H02M 5/2573; H02M 2001/0003; H02M 2001/0009
See application file for complete search history.

(56) References Cited

U.S. PATENT DOCUMENTS

| 5,977,660 | A | 11/1999 | Mandalakas et al. |
| 6,861,897 | B1 | 3/2005 | Cheng et al. |
| 6,862,199 | B2 | 3/2005 | Escobar et al. |

(Continued)

FOREIGN PATENT DOCUMENTS

| CN | 101447673 A | 6/2009 |
| CN | 101847875 A | 9/2010 |

(Continued)

*Primary Examiner* — Jue Zhang
*Assistant Examiner* — Lakaisha Jackson
(74) *Attorney, Agent, or Firm* — Posz Law Group, PLC

(57) ABSTRACT

A static synchronous compensator device connected between a source and a load of a three-phase power system, comprising: a main feedback line configured to provide a main feedback signal from lines between the source and the load; a mixer configured to mix the main feedback signal with a balance function to generate a balanced signal; a signal controller configured to convert the balanced signal to a controlled signal; a gain circuit configured to multiply the controlled signal by −1 and to perform proportional gain and integral gain (P & I) processing on the controlled signal to generate an intermediate correction signal; and a pulse width modulator configured to apply a pulse width modulation pattern to modulate the voltage source inverter to generate an AC waveform that is applied to the lines between the source and the load.

20 Claims, 12 Drawing Sheets

(56) References Cited

U.S. PATENT DOCUMENTS

| | | | |
|---|---|---|---|
| 7,405,498 B2 | 7/2008 | Rastogi et al. | |
| 8,259,480 B2 | 9/2012 | Hasler | |
| 9,590,483 B1* | 3/2017 | Basic | H02J 3/1857 |
| 2012/0112551 A1* | 5/2012 | Li | H02J 3/386 307/82 |
| 2017/0322523 A1* | 11/2017 | Vau | G05B 19/19 |

FOREIGN PATENT DOCUMENTS

| | | |
|---|---|---|
| TW | 296873 U | 1/1997 |
| TW | 318727 B | 12/2009 |
| WO | 2004/027959 A1 | 4/2004 |
| WO | 2014/198308 A1 | 12/2014 |

\* cited by examiner

STATIC SYNCHRONOUS COMPENSATOR DEVICE AND RELATED METHOD OF PHASE BALANCING A THREE-PHASE POWER SYSTEM

TECHNICAL FIELD

The present invention relates generally to a system and method for phase balancing a three-phase power system. More particularly, the present disclosure relates to a system and method for phase balancing a three-phase power system using a modular multilevel converter (MMC) topology by shifting the neutral of a connected three-phase inverter.

BACKGROUND

In a three-phase voltage system, the three-phase voltage or current can become unbalanced. In such a case, it is desirable to balance the three-phase voltage or current. One way to achieve this is through the use of a static synchronous compensator (STATCOM), which supplies a signal to the three-phase power system that balances the three-phase voltage or current.

A STATCOM is a regulating device used on alternating current electricity transmission networks. It is based on a power electronics voltage-source converter and can act as either a source or a sink of reactive AC power to an electricity network. If connected to a source of power it can also provide active AC power.

However, when a conventional system balances voltages or currents in a three-phase power system, the STATCOM compensates for unbalanced magnitudes by adjusting the magnitudes of the voltages or currents. The phases of the three-phase power system (i.e., the phases of an A voltage or current, a B voltage or current, and a C voltage or current) are always kept 120 degrees apart. In other words, the A voltage or current will always be 120° separated from the B voltage or current; the B voltage or current will always be 120° separated from the C voltage or current; and the A voltage or current will always be 120° separated from the C voltage or current.

It would therefore be advantageous to balance a three-phase power system by changing the phase relationship between the three-phase voltages or currents in addition to or instead of changing the magnitudes of these signals.

SUMMARY

A static synchronous compensator device is connected between a source and a load of a three-phase power system, comprising: a main feedback line configured to provide a main feedback signal from lines between the source and the load; a mixer configured to mix the main feedback signal with a balance function to generate a balanced signal; a signal controller configured to convert the balanced signal to a controlled signal; a main processor configured to multiply the DQ signal by −1 and to perform proportional gain and integral gain (P & I) processing on the DQ signal to generate an intermediate correction signal; and a pulse width modulator configured to apply a pulse width modulation pattern to modulate the voltage source inverter to generate an AC waveform that is applied to the lines between the source and the load.

The signal controller may be a Rotating Frame Controller (RFC) including ABC/DQ convertor configured to perform an ABC/DQ conversion, and the controlled signal may be a DQ signal.

The static synchronous compensator device may further comprise: a limiting circuit, located between the mixer and the signal controller, configured to perform a limiting function on the balanced signal, the limiting function being a function that limits a current and voltage of the balanced signal to a maximum current and voltage, respectively.

The main processor may further comprise: a multiplier configured to multiply the controlled signal by −1; and a P&I processor configured to perform the P&I processing on the controlled signal.

The multiplier may be arranged before the P&I processor, or the P&I processor may be arranged before the multiplier.

The static synchronous compensator device may further comprise: a voltage feedback line configured to provide a voltage feedback signal from the lines between the source and the load; a current feedback line configured to provide a current feedback signal from the lines between the source and the load and; a selector configured to select one of the voltage feedback signal and the current feedback signal as the main feedback signal in response to a voltage/current selection signal.

The static synchronous compensator device may further comprise: a voltage feedback mixer configured to subtract a static synchronous compensator voltage feedback signal from a load voltage feedback signal to generate the voltage feedback signal.

The static synchronous compensator device may further comprise: a current feedback mixer configured to subtract a static synchronous compensator current feedback signal from a load current feedback signal to generate the current feedback signal.

The main processor may be further configured to generate a three-phase correction voltage as the intermediate correction signal such that the summation of the three-phase correction voltage and an unbalanced voltage between the source and the load is a balanced voltage.

The main processor may be further configured to generate a three-phase correction current as the intermediate correction signal such that the summation of the three-phase correction current and an unbalanced current between the source and the load is a balanced current.

The final correction signal may be provided to the lines connecting the source and the load closer to the load than to the source.

A power signal between the source and the load may be an unbalanced power signal; and the final correction signal may include one or both of negative and zero sequence components.

A method of phase balancing a three-phase power system is provided, comprising: receiving a main feedback signal from an unbalanced power signal on a line between a source and a load; generating a correction signal in a static synchronous compensator (STATCOM) based on the main feedback signal where magnitudes of the correction signal are adjusted and angles of the correction signal are balanced such that the correction signal will result in a zero summation with an error signal, the error signal being the difference between a balanced power signal and the unbalanced power signal; applying the correction signal from the STATCOM to the line between the source and the load so that that the correction signal will balance the magnitudes of the unbalanced power signal and adjust the angles of the unbalanced power signal such that the error signal will be zero, wherein the summation of the unbalanced power signal and the correction signal is a balanced power signal.

The main feedback signal may be one of a voltage feedback signal or a current feedback signal.

The operation of receiving a main feedback signal may further comprise: obtaining a voltage feedback signal; obtaining a current feedback signal; selecting one of the voltage feedback signal and the current feedback signal as the main feedback signal.

The generation of the correction signal may further comprise: generating a three-phase correction voltage such that the summation of the three-phase correction voltage and an unbalanced voltage in the unbalanced power signal is a balanced voltage.

The generation of the correction signal may further comprise: generating a three-phase correction current such that the summation of the three-phase correction current and an unbalanced current in the unbalanced power signal is a balanced current.

The correction signal may be a pulse width modulated signal.

The correction signal may be provided to the lines connecting the source and the load closer to the load than to the source.

A method of phase balancing a three-phase power system is provided, comprising: obtaining a main feedback signal from lines connecting the source and load of the three-phase power system; mixing the main feedback signal with a balancing function to generate a balanced feedback; applying a limit function to the balanced feedback to generate a limited signal that is limited to a set current or voltage maximum; processing and inverting the limited signal to generate an intermediate corrections signal; applying a pulse width modulation pattern to the intermediate correction signal to generate a final correction signal; and applying the final correction signal to the lines connecting the source and load of the three-phase power system, wherein the summation of the final correction signal and an unbalanced power signal on the lines between the source and the load is a balanced power signal.

The method may further comprise: performing a DQ conversion operation on the limiting signal before sending the limiting signal to processing and inverting the limited signal to convert the limited signal into a DQ format;

The operation of processing and inverting may include performing proportional gain and integral gain (P & I) processing on the limiting signal to generate an initial correction signal; and multiplying the intermediate correction signal by −1 to generate the intermediate correction signal.

The operation of processing and inverting may include multiplying the limiting signal by −1 to generate a negative correction signal; and performing proportional gain and integral gain (P & I) processing on the negative correction signal to generate the intermediate correction signal.

The main feedback signal may be one of a voltage feedback signal or a current feedback signal.

The method may further comprise: obtaining a voltage feedback signal from the lines connecting the source and load; obtaining a current feedback signal from the lines connecting the source and load; and selecting one of the voltage feedback signal and the current feedback signal as the main feedback signal.

The operation of obtaining a voltage feedback signal may further comprise: obtaining a static synchronous compensator (STATCOM) voltage feedback signal from a STATCOM; obtaining a load voltage feedback signal from the lines connecting the source and load; and subtracting the STATCOM voltage feedback signal from the load voltage feedback signal to generate the voltage feedback signal.

The operation of obtaining the current feedback signal may further comprise: obtaining a static synchronous compensator (STATCOM) current feedback signal from a STATCOM; obtaining a load current feedback signal from the lines connecting the source and load; and subtracting the STATCOM current feedback signal from the load current feedback signal to generate the current feedback signal.

The operations of applying the limit function, processing and inverting the limiting signal, and applying the pulse wave modulation pattern to the negative correction signal are performed in a static synchronous compensator (STATCOM) device.

The P&I processing may further include: generating a three-phase correction voltage such that the summation of the three-phase correction voltage and an unbalanced voltage in the unbalanced power signal is a balanced voltage.

The P&I processing may further include: generating a three-phase correction current such that the summation of the three-phase correction current and an unbalanced current in the unbalanced power signal is a balanced current.

The correction signal may be provided to the lines connecting the source and the load closer to the load than to the source.

The unbalanced power signal may contain only positive sequence components; and the final correction signal includes one or both of negative and zero sequence components.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention. These drawings are not necessarily drawn to scale.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Furthermore, elements having the same number represent the same element across the various figures, and throughout the disclosure. Their description is not always repeated for each embodiment, but may be inferred from previous descriptions. Elements that have the same number but have the addition of a letter designator indicate distinct embodiments of a more generic element.

Overview

The disclosed system is a current and voltage balancing system and method in a three-phase power system that shifts the neutral position to achieve balance by adjusting the phases between an A voltage or current and a B voltage or current, between the B voltage or current and a C voltage or current, and the A voltage or current and the C voltage or current using a STATCOM. This allows for a cheaper STATCOM to be designed and used.

Figure 1:
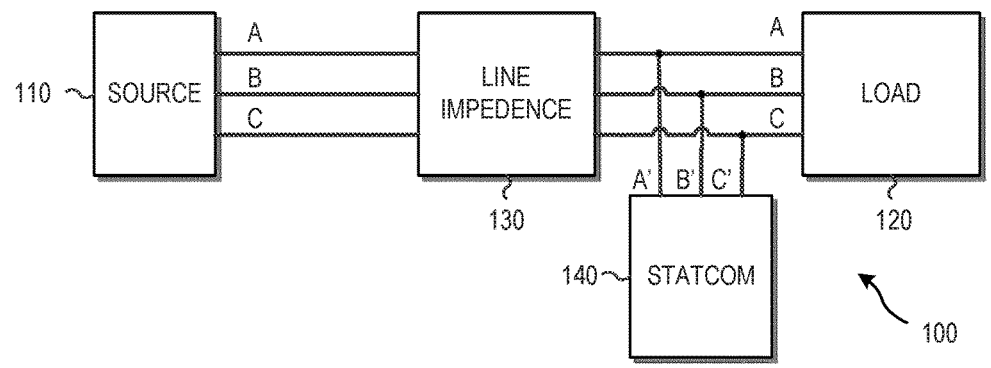
FIG. 1 is a block diagram of a three-phase power system including a STATCOM device, according to disclosed embodiments.

FIG. 1 is a block diagram of a three-phase power system 100 including a STATCOM device, according to disclosed embodiments. As shown in FIG. 1, the three-phase power system includes a source 110, a drain 120, a line impedance 130, and a STATCOM 140.

The source 110 is a three-phase power system that provides a three-phase power signal along three power lines A, B, and C.

The drain (or load) 120 is connected to the three power lines A, B, and C, and consumes the power provided by the source 110.

The line impedance 130 represents the impedance along the three power lines A, B, and C.

The STATCOM 140 is a static synchronous compensator that has three output lines A', B', and C' that provide correction signals to the three power lines A, B, and C.

In operation, STATCOM will examine the power signals provided by the source 110 and determine what signals should be provided on lines A', B', and C' to balance the power signals on the three power lines A, B, and C according to a desired balancing scheme.

As noted, after balancing, the phase difference between the signals on lines A, B, and C may not necessarily be 120°.

Furthermore, since the STATCOM 140 is located closer to the drain 120 (i.e., with the primary line impedance 130 located between the source 110 and where the lines A', B', and C' meet the lines A, B, and C), the correction value is applied primarily to the drain 120 rather than to the source 110. As a result, the unbalanced load is corrected nearest the problem. By applying the correction value from the STATCOM at the drain 120, this allows a utility company to have smaller cables and less voltage drop across the cables. This allows for greater efficiency for utility transmission on the entire distribution side up to where the STATCOM 140 connects to the lines A, B, and C.

STATCOM Device

Figure 2:
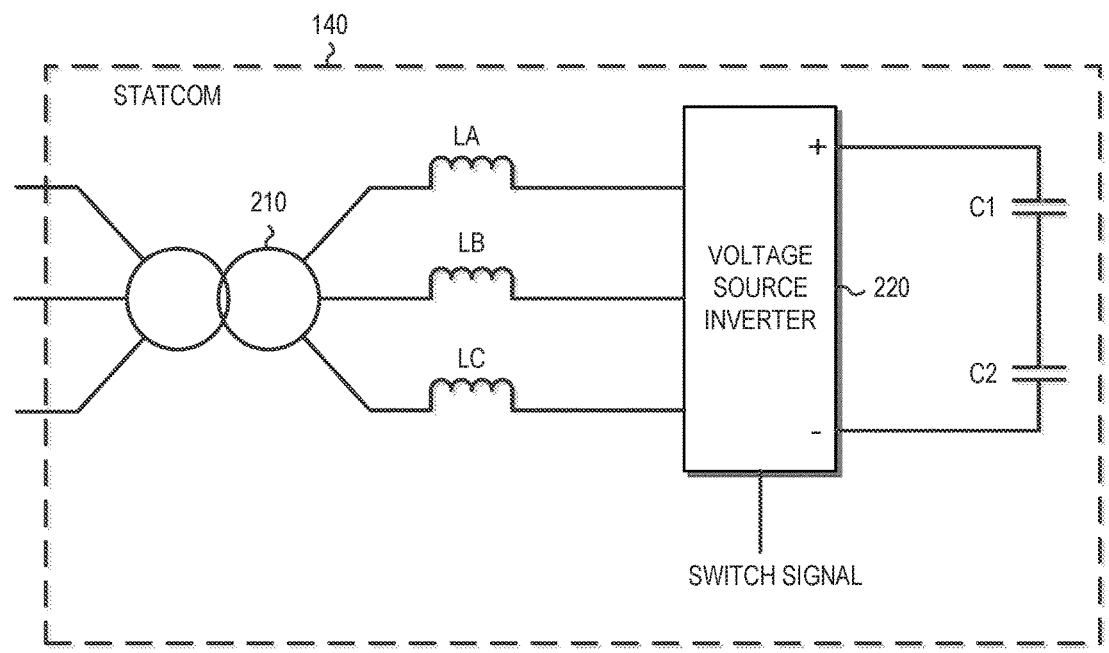
FIG. 2 is a circuit diagram of a STATCOM device according to disclosed embodiments.

FIG. 2 is a circuit diagram of a STATCOM device 140 according to disclosed embodiments. As shown in FIG. 2, the STATCOM device 140 includes a transformer 210, first, second, and third inductors LA, LB, and LC, a voltage source inverter 220 which includes capacitors, represented by first and second capacitors C1 and C2.

The transformer 210 operates as a coupling transformer between the voltage source inverter 220 and the power lines A, B, and C of FIG. 1. The transformer 210 is common to a STATCOM, but not required. Alternate embodiments can omit the transformer 210 as desired.

The first, second, and third inductors LA, LB, and LC operate to provide a reactance between the voltage source inverter 220 and the transformer 210.

The voltage source inverter 220 operates to transfer real power from a DC power on the first and second capacitors C1 and C2 to an AC load (e.g., the three-phase power lines A, B, and C connected to the source 110) via lines A', B', and C'. The amplitude of the AC output voltage of the voltage source inverter 220 is preferably controlled by adjusting the phase relationship between the source 110 and the STATCOM 140 using a pulse width modulated (PWM) signal of the voltage source inverter 220.

The first and second capacitors C1 and C2 provide a DC voltage for the voltage source inverter 220. This voltage is derived from the source voltage via the free wheeling diodes shown in FIGS. 5 as D1, D2, D3, & D4.

Figure 3:
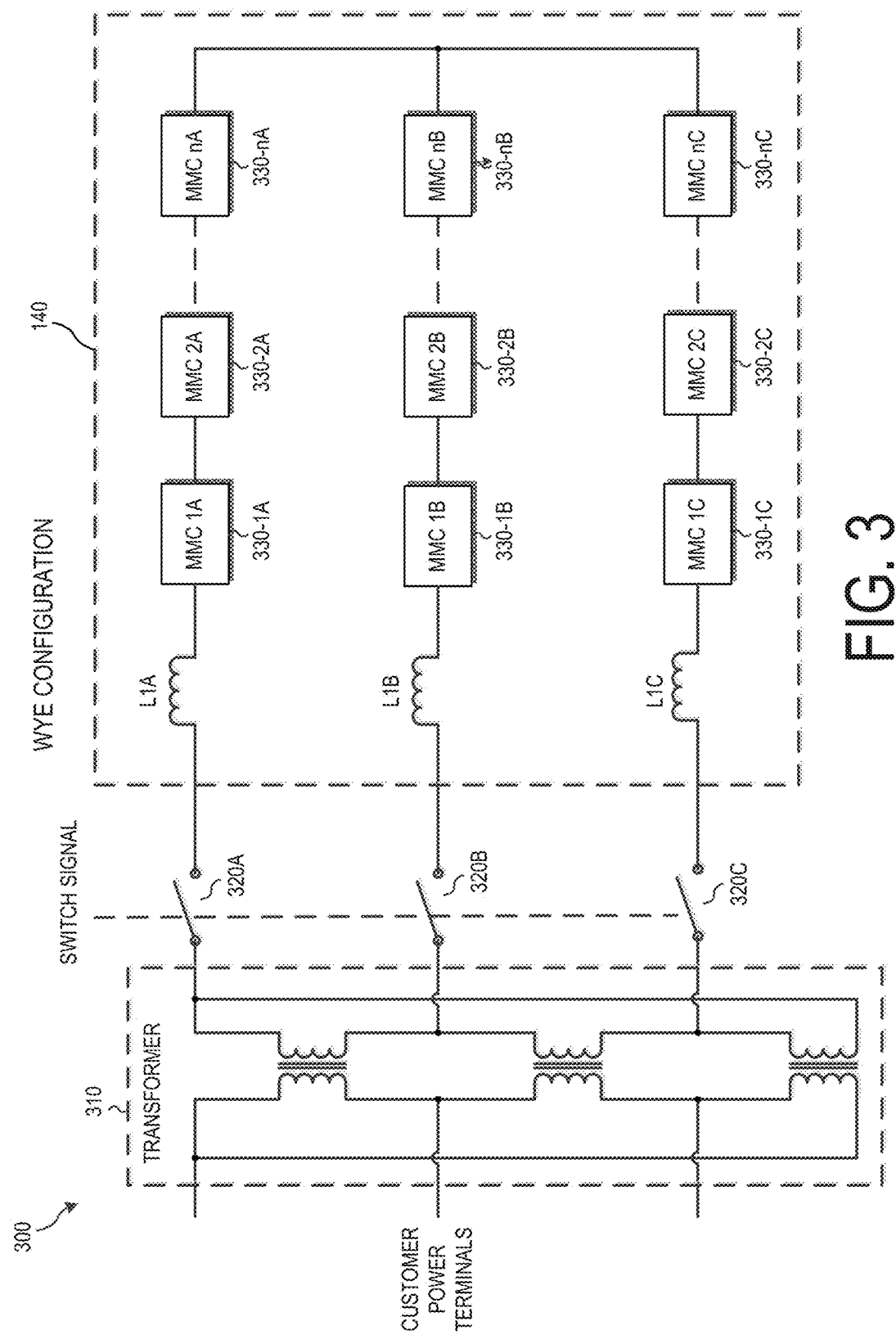
FIG. 3 is a circuit diagram of a STATCOM device using modular multilevel converters (MMCs) in a Wye configuration, according to disclosed embodiments.

FIG. 3 is a circuit diagram of a STATCOM device 140 using modular multilevel converters (MMCs) in a Wye configuration, according to disclosed embodiments. As shown in FIG. 3, the STATCOM device 140 includes first through third inductors L1A, L1B, and L1C, a plurality of first MMCs 330-1A, 330-2A, . . . , 330-nA, a plurality of second MMCs 330-1B, 330-2B, ..., 330-nB, and a plurality of third MMCs 330-1C, 330-2C, ..., 330-nC. A transformer 310 is connected to the STATCOM device 140 via first through third switches 320A, 320B, and 320C.

The transformer 310 operates as a coupling transformer between the MMCs 330-1A, 330-nC and customer power terminals (e.g., the three-phase power lines A, B, and C connected to the source 110) via lines A', B', and C'. In these disclosed embodiments, the transformer 310 has a Delta/Delta configuration.

The first through third switches 320A, 320B, and 320C control the connection of the remainder of the STATCOM device 140 to the transformer 310 based on a switch signal.

The first through third inductors L1A, L1B, and L1C operate to provide a leakage reactance between the MMCs 330-1A, ..., 330-nC and the transformer 310.

The plurality of first MMCs 330-1A, 330-2A, ..., 330-nA are arranged in series between the first inductor L1A and both a final MMC 330-nB in the plurality of second MMCs 330-1B, 330-2B, ..., 330-nB and a final MMC 330-nC in the plurality of third MMCs 330-1C, 330-2C, ..., 330-nC.

The plurality of second MMCs 330-1B, 330-2B, ..., 330-nB are arranged in series between the second inductor L1B and both a final MMC 330-nA in the plurality of first MMCs 330-1A, 330-2A, ..., 330-nA and a final MMC 330-nC in the plurality of third MMCs 330-1C, 330-2C, ..., 330-nC.

The plurality of third MMCs 330-1C, 330-2C, ..., 330-nC are arranged in series between the third inductor L1C and both a final MMC 330-nA in the plurality of first MMCs 330-1A, 330-2A, ..., 330-nA and a final MMC 330-nB in the plurality of second MMCs 330-1B, 330-2B, ..., 330-nB.

Figure 4:
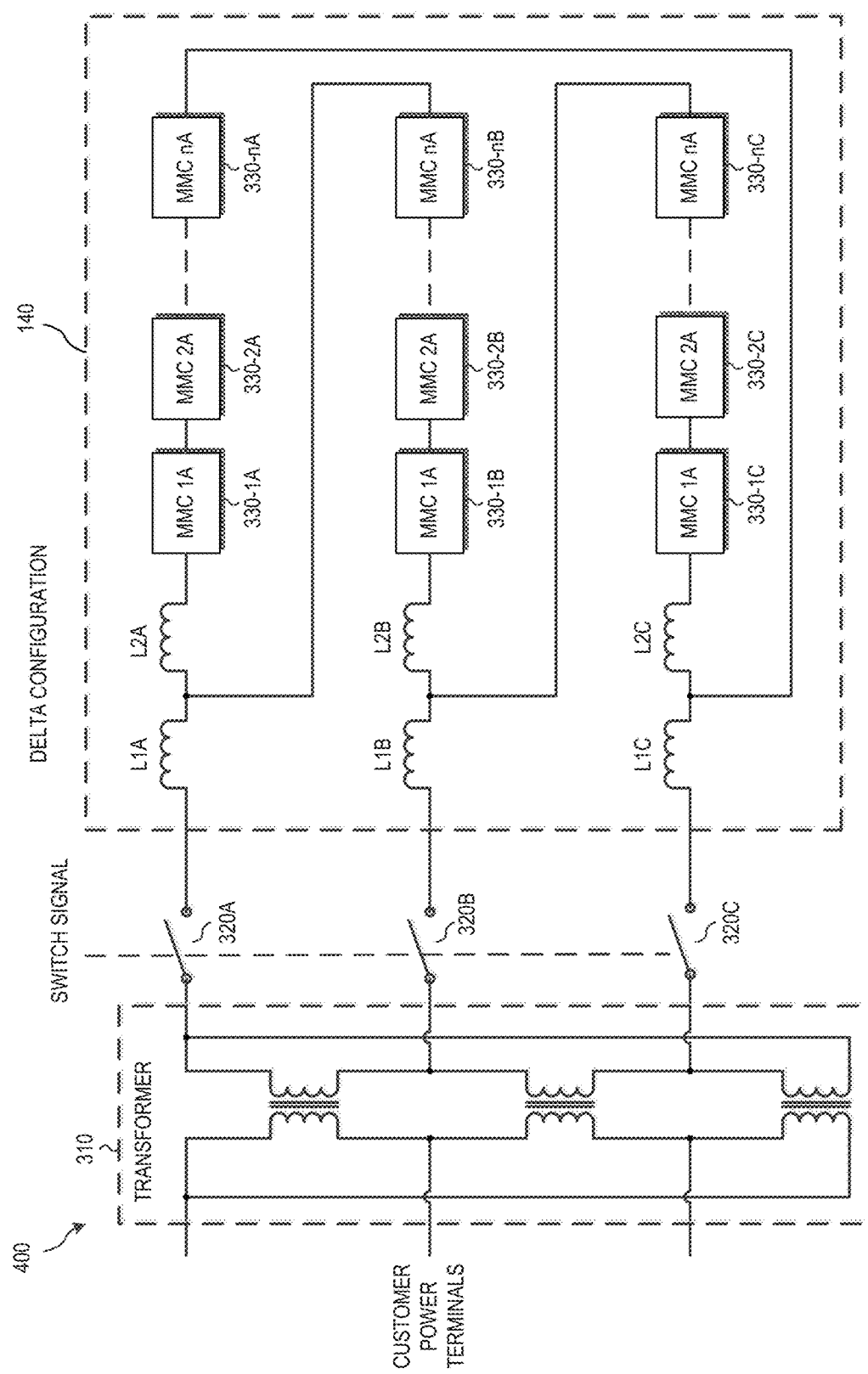
FIG. 4 is a circuit diagram of a STATCOM device 140 using MMCs in a Delta configuration, according to disclosed embodiments.

FIG. 4 is a circuit diagram of a STATCOM device 140 using MMCs in a Delta configuration, according to disclosed embodiments. As shown in FIG. 4, the STATCOM device 140 includes first and second A-line inductors L1A, L2A, first and second B-line inductors L1B, L2B first and second C-line inductors L1C, L2C, a plurality of first MMCs 330-1A, 330-2A, ..., 330-nA, a plurality of second MMCs 330-1B, 330-2B, ..., 330-nB, and a plurality of third MMCs 330-1C, 330-2C, ..., 330-nC. A transformer 310 is connected to the STATCOM 140 by first through third switches 320A, 320B, and 320C.

The transformer 310 operates as a coupling transformer between the MMCs 330-1A, 330-nC and customer power terminals (e.g., the three-phase power lines A, B, and C connected to the source 110). In these disclosed embodiments, the transformer 310 has a Delta configuration.

The first through third switches 320A, 320B, and 320C control the connection of the remainder of the STATCOM device 140 to the transformer 310 based on a switch signal.

The first A-line inductors L1A, first B-line inductors L1B first C-line inductors L1C, operate to provide a leakage reactance between the MMCs 330-1A, ..., 330-nC and the transformer 310. The second A-line inductor L2A operates to provide a leakage reactance internal to the Delta between the MMCs 330-1A, 330-2A, ..., 330-nA and the plurality of MMCs 330-1B, 330-2B, ..., 330-nB. The second B-line inductor L2B operates to provide a leakage reactance internal to the Delta between the MMCs 330-1B, 330-2B, ..., 330-nB and the plurality of MMCs 330-1C, 330-2C, ..., 330-nC. The second C-line inductor L2C operates to provide a leakage reactance internal to the Delta between the MMCs 330-1C, 330-2C, ..., 330-nC and the plurality of MMCs 330-1A, 330-2A, ..., 330-nA The plurality of first MMCs 330-1A, 330-2A, ..., 330-nA are arranged in series with the A-line inductor L2A between the second A-line inductor L1A and a point between the first C-line indicator L1C and the second C-line inductor L2C.

The plurality of second MMCs 330-1B, 330-2B, ..., 330-nB are arranged in series with the B-line inductor L2B between the second B-line inductor L1B and a point between the first A-line indicator L1A and the second A-line inductor L2A.

The plurality of third MMCs 330-1C, 330-2C, ..., 330-nC are arranged in series the C-Line inductor L2C between the second C-line inductor L1C and a point between the first B-line indicator L1B and the second B-line inductor L2B.

Modular Multilevel Converter (MMC)

Figure 5:
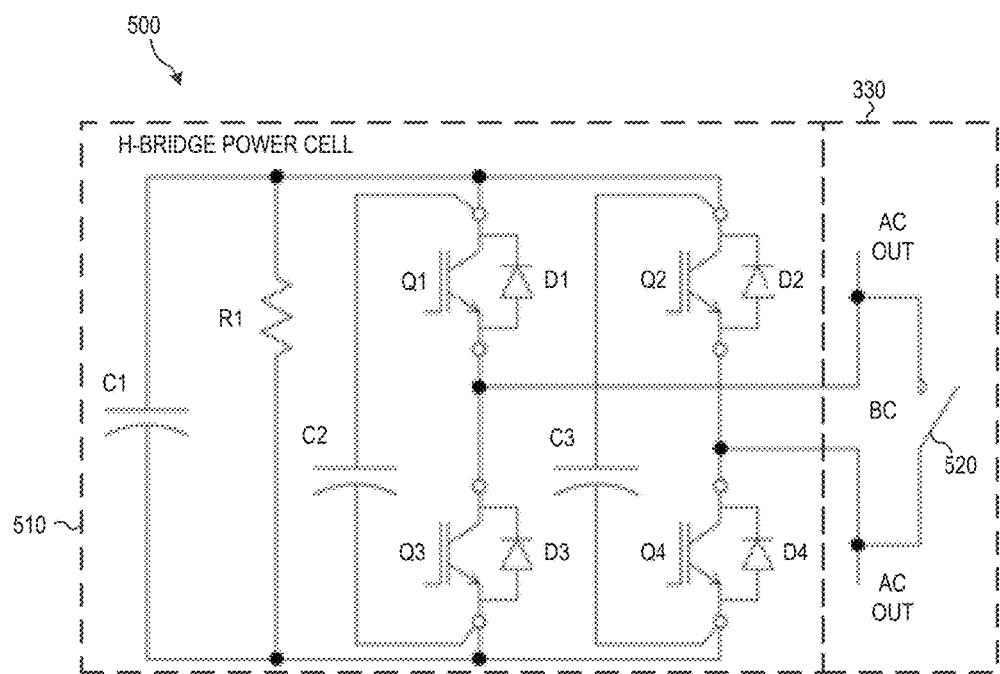
FIG. 5 is a circuit diagram of power cell or module that makes up the MMC according to disclosed embodiments.

FIG. 5 is a circuit diagram of a power cell 500 or module that makes up a modular multilevel converter (MMC) 140 according to disclosed embodiments. As shown in FIG. 5, the power cell 510 includes IGBT's or transistors in an H-bridge configuration, and a bypass switch 330. The H-bridge power cell 510 further includes a bulk capacitor C1, first and second snubber capacitors C2 and C3, a discharge resistor R1, first through fourth transistors Q1, Q2, Q3, and Q4, and first through fourth diodes D1, D2, D3, and D4.

In the H-bridge power cell 510, the first through fourth transistors Q1, Q2, Q3, and Q4 are arranged in parallel with the first through fourth diodes D1, D2, D3, and D4, respectively. The first transistor Q1 and the first diode D1 are arranged in series with the third transistor Q3 and the third diode D3, while the second transistor Q2 and the second diode D2 are arranged in series with the fourth transistor Q4 and the fourth diode D4.

The combination of the first transistor Q1, the first diode D1, the third transistor Q3, and the third diode D3 is arranged in parallel with the combination of the second transistor Q2, the second diode D2, the fourth transistor Q4, and the fourth diode D4, as well as with the bulk capacitor C1, the first and second snubber capacitors C2 and C3, and the discharge resistor R1.

An input line is located at the connection between the first transistor Q1/first diode D1 and the third transistor Q3/third diode D3, while an output line is located at the connection between the second transistor Q2/second diode D2 and the fourth transistor Q4/fourth diode D4.

The bypass switch 520 is located in parallel between the input line and the output line as a bypass circuit, allowing the H-bridge power cell to be bypassed if necessary.

The use of H-Bridge Power Cells configured as an MMC inverter in a STATCOM as a voltage source inverter allows for a modular design of the voltage source inverter. In this way, if there is a malfunction in one H-Bridge Power Cell, that H-Bridge Power Cell can be bypassed, allowing the remaining portion of the circuit to continue operating.

Three-Phase Power

There are two types of circuits used to maintain equal load across the three wires in a three-phase system—Delta and Wye. The Delta configuration has the three phases connected like a triangle, whereas the Wye configuration has all three loads connected to a single neutral point.

Figure 6A:
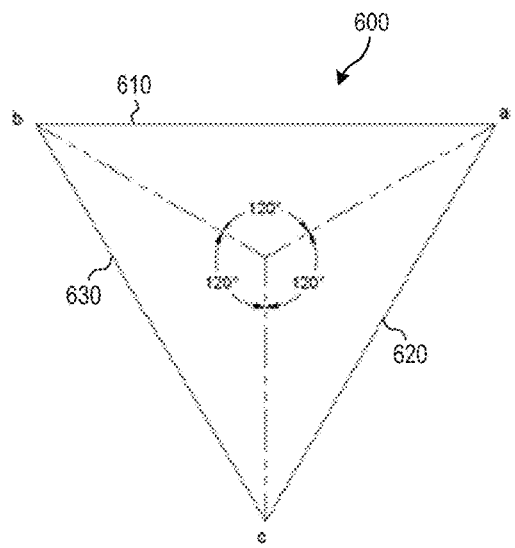
FIG. 6A is a diagram of a Delta configuration, according to disclosed embodiments.
Figure 6B:
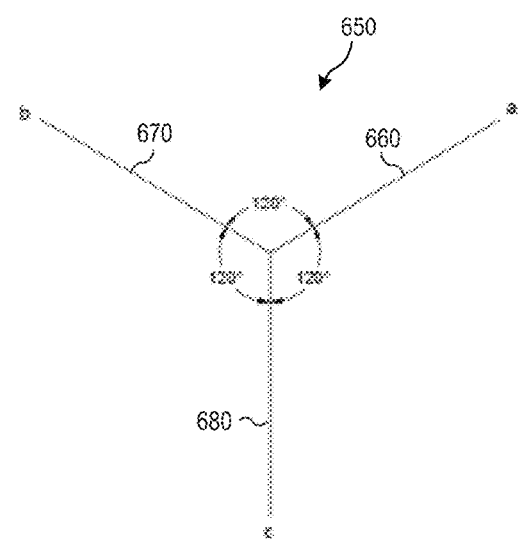
FIG. 6B is a diagram of a Wye configuration, according to disclosed embodiments.

FIG. 6A is a diagram of a Delta configuration 600, according to disclosed embodiments, while FIG. 6B is a diagram of a Wye configuration 650, according to disclosed embodiments.

As shown in FIG. 6A, a Delta configuration 600 includes a first magnitude 610 between power lines A and B, a second magnitude 620 between power lines A and C, and a third magnitude 630 between power lines B and C.

As shown in FIG. 6B, a Wye configuration 650 includes a first magnitude 660 between power line A and a neutral point N, a second magnitude 670 between power line B and the neutral point N, and a third magnitude 680 between the power line C and the neutral point N.

Each configuration has a line voltage $V_{line}$ that refers to the amount of voltage measured between any two line conductors in a balanced three-phase system. Phase voltage $V_{phase}$ refers to the voltage measured across any one component (source winding or load impedance) in a balanced three-phase source or load. The terms line current $I_{line}$ and phase current $I_{phase}$ follow the same logic: the former referring to current through any one line conductor, and the latter to current through any one component.

For a balanced Delta configuration 600, the voltages and currents are as follows:

$$V_{phase} = V_{line} \quad (1)$$

$$I_{phase} = I_{line} \cdot \sqrt{3} \quad (2)$$

For a balanced Wye arrangement, the voltages and currents are as follows:

$$V_{phase} = V_{line} \cdot \sqrt{3} \quad (3)$$

$$I_{phase} = I_{line} \quad (4)$$

Power, in either case, can be represented as:

$$\text{Power} = V_{phase} \cdot I_{phase} \cdot 3 \quad (5)$$

Figure 7:
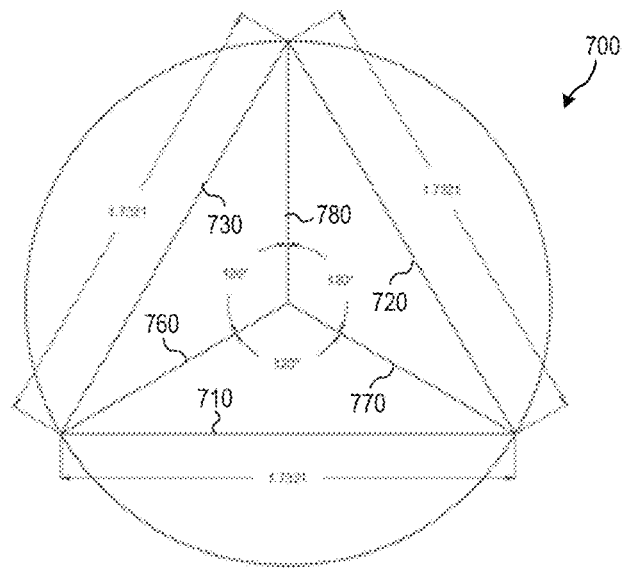
FIG. 7 is a representation showing the line-to-line voltage or current and line-to-neutral voltage or current in a balanced system, according to disclosed embodiments.

This can be seen in FIG. 7, which is a representation 700 showing the line-to-line voltage or current and line-to-neutral voltage or current in a balanced system, according to disclosed embodiments.

In particular, FIG. 7 discloses, a first line 710 is located between line A and line B; a second line 720 is located between line A and line C; a third line 730 is located between line B and line C; a fourth line 760 is located between line A and the neutral point N; a fifth line 770 is located between line B and the neutral point N; and a sixth line 780 is located between line C and the neutral point N.

As shown in FIG. 7, in a balanced system, the line-to-neutral voltage or line-to-neutral current will have a constant magnitude of 1.0 per unit, while the line-to-line voltage or line-to-line current will have a constant magnitude of 1.7321 per unit (i.e., one multiplied by the square root of three).

These numbers are by way of example only, however. They assume a value of 1.0 for the line-to-neutral voltage/current as a per unit or normalized voltage/current. The values for the line-to-neutral voltage/current could be multiplied by any number to achieve other values. However, the ratio between the value of the line-to-neutral voltage/current and the line-to-line voltage/current would remain the same.

Figure 8:
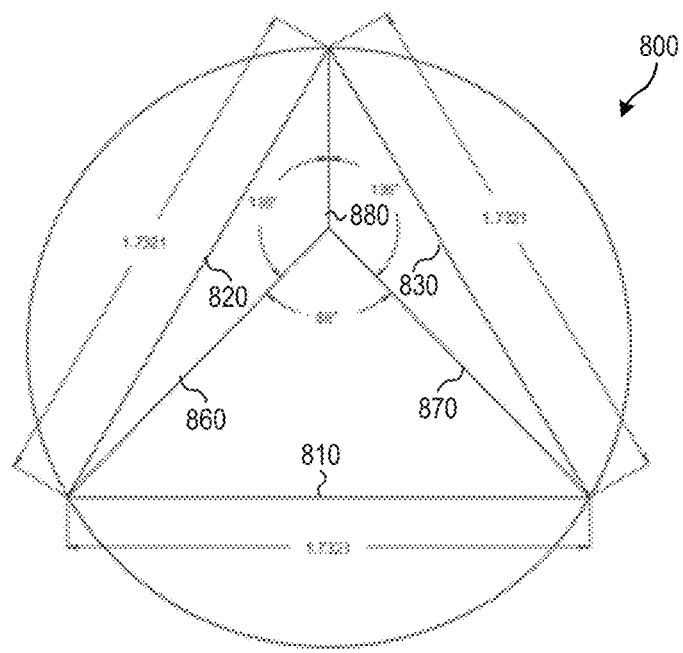
FIG. 8 is a representation showing line-to-line voltage or current and line-to-neutral voltage or current in an unbalanced system in which the neutral point has been shifted, according to disclosed embodiments.

FIG. 8 is a representation 800 showing line-to-line voltage or current and line-to-neutral voltage or current in an unbalanced system in which the neutral point has been shifted, according to disclosed embodiments. As shown in FIG. 8, a first line 810 is located between line A and line B; a second line 820 is located between line A and line C; a third line 830 is located between line B and line C; a fourth line 860 is located between line A and the neutral point N; a fifth line 870 is located between line B and the neutral point N; and a sixth line 880 is located between line C and the neutral point N.

Unlike the configuration shown in FIG. 7, the angles between the fourth, fifth, and sixth lines 860, 870, 880 are not all 120°. In particular, in this example, the angle between the first line 860 and the second line 870 is 136°; the angle between the first line 860 and the third line 880 is 136°; and the angle between the second line 870 and the third line 880 is 88°. The total of these three angles will always remain 360°, but if the neutral point N is moved, the exact values of the three angles formed by the fourth, fifth, and sixth lines 860, 870, 880 will change.

Furthermore, because these angles change, and the position of the neutral point N changes, the magnitudes of the fourth, fifth, and sixth lines 860, 870, 880 also change. However, the magnitudes of the first, second, and third lines 810, 820, 830 remain the same. Thus, while the line-to-line voltage or current remains constant, the line-to-neutral voltage or current does not.

Figure 9:
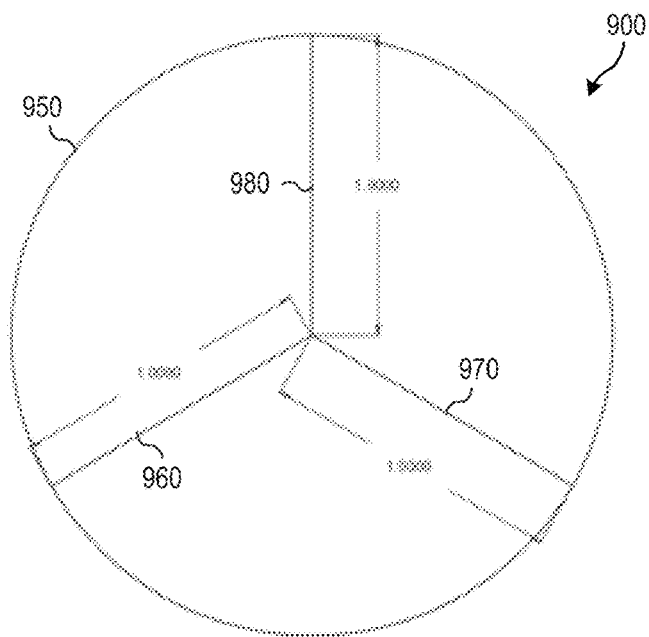
FIG. 9 is another representation of the fourth, fifth, and sixth lines in FIG. 7, according to disclosed embodiments.

FIG. 9 is another representation 900 of the fourth, fifth, and sixth lines 760, 770, 780 in FIG. 7, showing that the magnitude of the fourth, fifth, and sixth lines 760, 770, 780 in a balanced system are each equal to 1.0 (for a normalized representation). As noted above, this is by way of example only. Other values could be used for the magnitude of these lines. However, in a balanced system, each of the fourth, fifth, and sixth lines 760, 770, 780 would be of equal magnitude.

Figure 10:
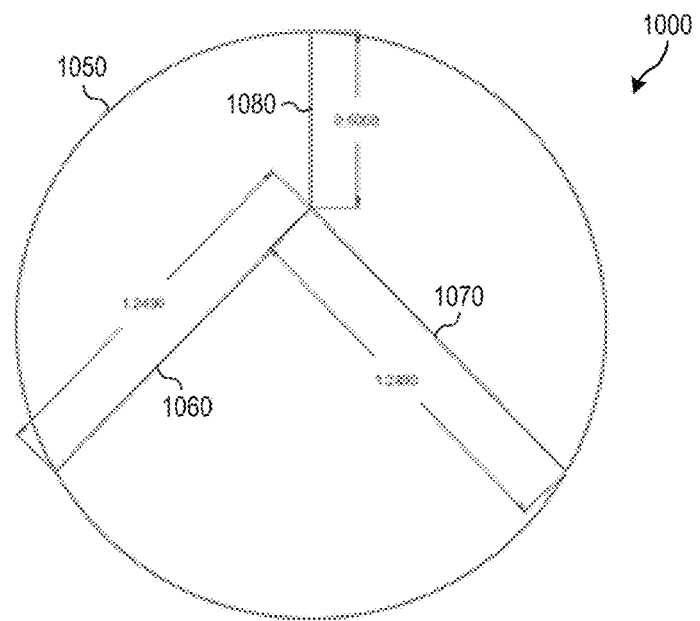
FIG. 10 is another representation of the fourth, fifth, and sixth lines in FIG. 8, according to disclosed embodiments.

FIG. 10 is another representation 1000 of the fourth, fifth, and sixth lines 860, 870, 880 in FIG. 8, showing the magnitude of the fourth, fifth, and sixth lines 860, 870, 880 in the unbalanced system of FIG. 8. In particular, the first line 860 has a magnitude of 0.6; the second line 870 has a magnitude of 1.249; and the third line 880 has a magnitude of 1.249. As noted above, these values are by way of example only. Other values could be used for these lines. However, in the unbalanced system of FIG. 8, the ratio of the magnitudes would remain the same.

Balancing of the Power Signals

When the power system 100 is unbalanced, it is desirable to operate the STATCOM 140 such that it balances out the unbalanced three-phase power signal.

A STATCOM 140, using MMC topology and the proper control methodology, can shift the neutral point with respect to each phase magnitude in a three-phase power signal. This is true regardless of the number of power cells in series. This neutral shift technique can be applied to a STATCOM 140 to balance an unbalanced system.

A distribution system can have unbalanced voltages, currents, and impedances. However, the transmission line will have 120° between each phase voltage $V_{phase}$ and each phase current $I_{phase}$. With a STATCOM 140, the angle between the phase voltage $V_{phase}$, or phase current $I_{phase}$, can be controlled such that they are not balanced or not 120° apart from each other.

For a (normalized) balanced system, the voltages at lines A, B, and C are:

$$V_A = 1 \text{ ang}(0°) \quad (6)$$

$$V_B = 1 \text{ ang}(-120°) \quad (7)$$

$$V_C = 1 \text{ ang}(120°) \quad (8)$$

Therefore, a balanced phase voltage $V_{balanced}$ would be:

$$V_{balanced} = 1 \text{ ang}(0°) + 1 \text{ ang}(-120°) + 1 \text{ ang}(120°) = 0 \quad (9)$$

Consider, however, an example of an unbalanced system in which the angles were the same, but the magnitude of the signal at the A line has a smaller magnitude:

$$V_A = 0.8 \text{ ang}(0°) \quad (10)$$

$$V_B = 1 \text{ ang}(-120°) \quad (11)$$

$$V_C = 1 \text{ ang}(120°) \quad (12)$$

Therefore, an unbalanced phase voltage $V_{unbalanced}$ would be:

$$V_{unbalanced}=0.8 \, ang(0°)+1 \, ang(-120°)+ 1 \, ang(120°)=-0.2 \quad (13)$$

Consider, in the alternative, the following unbalanced system in which the magnitude of the signal at the C line has a smaller magnitude:

$$V_A=1 \, ang(0°) \quad (14)$$

$$V_B=1 \, ang(-120°) \quad (15)$$

$$V_C=0.8 \, ang(120°) \quad (16)$$

An unbalanced phase voltage $V_{unbalanced}$ in this situation would be:

$$V_{unbalanced} = 1 \, ang(0°) + 1 \, ang(-120°) + 0.8 \, ang(120°) \quad (17)$$
$$= 0.1 - j0.173$$
$$= 0.2 \, ang(-60)$$

Given that a+b+c=0, in a balanced system, the angle between the phases of the STATCOM can be changed to balance an unbalanced system. It is not necessary to change the magnitudes to achieve this result, although the STATCOM magnitude may be changed in alternate embodiments.

In particular, it is desirable to arrange the magnitude of the STATCOM voltages such that:

$$V_{A\text{-}load}+V_{B\text{-}load}+V_{C\text{-}load}+V_{A\text{-}STATCOM}+V_{B\text{-}STATCOM}+ V_{C\text{-}STATCOM}=0. \quad (18)$$

The unbalanced voltage $V_{unbalanced}$ from this load is shown in this example by Equation (17). Therefore, the STATCOM 140 should provide a signal that, when combined with the Equation (17) will total zero. For example, the STATCOM voltage $V_{STATCOM}$ could be calculated as follows:

$$V_{STATCOM}=0.2 \, ang(60°)+0.2 \, ang(-120°)+0.2 \, ang (120°). \quad (19)$$

This leads to a combined balanced signal in which:

$$V_{unbalanced} + V_{STATCOM} = 1 \, ang(0°) + 1 \, ang(-120°) + 0.8 \, ang(120°) + \quad (20)$$
$$0.2 \, ang(60°) + 0.2 \, ang(-120°) + 0.2 \, ang(120°)$$
$$= 0.$$

Although the above example uses a voltage correction, it should be noted that the above process could be used to balance either the voltage or the current, as needed. All that is necessary is to have the STATCOM provide the necessary correction voltage or correction current using the process noted above.

Figure 11:
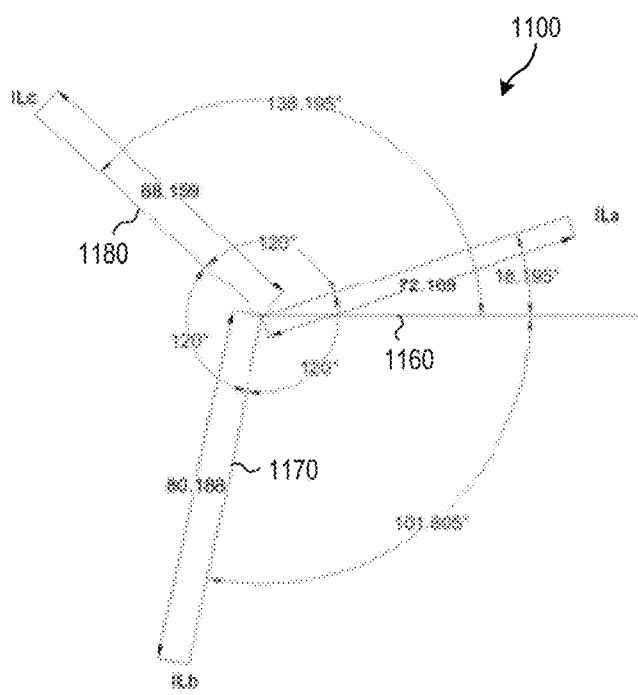
FIG. 11 is a representation of an unbalanced current magnitude in a three-phase power system, according to disclosed embodiments.

FIG. 11 is a representation 1100 of an unbalanced current in a three-phase power system, according to disclosed embodiments. As shown in FIG. 11, current magnitudes are unbalanced, while voltage magnitudes are balanced:

$$V_{LA}=4156.922\angle 0°, \quad (21)$$

$$V_{LB}=4156.922\angle -120°, \quad (22)$$

$$V_{LC}=4156.922\angle 120°, \quad (23)$$

$$I_{LA}=72.169\angle 18.195°, \quad (24)$$

$$I_{LB}=80.188\angle -101.805°, \quad (25)$$

$$I_{LC}=68.159\angle 138.195°, \quad (26)$$

$$PF_L=0.95, \quad (27)$$

where $V_{LA}$, $V_{LB}$, and $V_{LC}$ are the load voltages for lines A, B, and C, respectively, where $I_{LA}$, $I_{LB}$, and $I_{LC}$ are the load currents for lines A, B, and C, respectively, and $PF_L$ is power factor for the three-phase load.

The line current for the sum of the three lines can be determined by the sum of the three individual line currents:

$$I_{line} = I_{LA} + I_{LB} + I_{LC} \quad (28)$$
$$= 72.2 \, ang(18.195°) + 80.2 \, ang(-101.805°) +$$
$$68.2 \, ang(138.195°)$$
$$= 10.6 \, ang(-82.7°)$$

The phase current can be determined by dividing the line current by $\sqrt{3}$. It should be understood that for a WYE configured system $V_{phase}\cdot\sqrt{3}=V_{line}$, and $I_{phase}=I_{line}$, while for a DELTA system $V_{phase}=V_{line}$ and $I_{phase}\cdot\sqrt{3}=I_{line}$.

Figure 12:
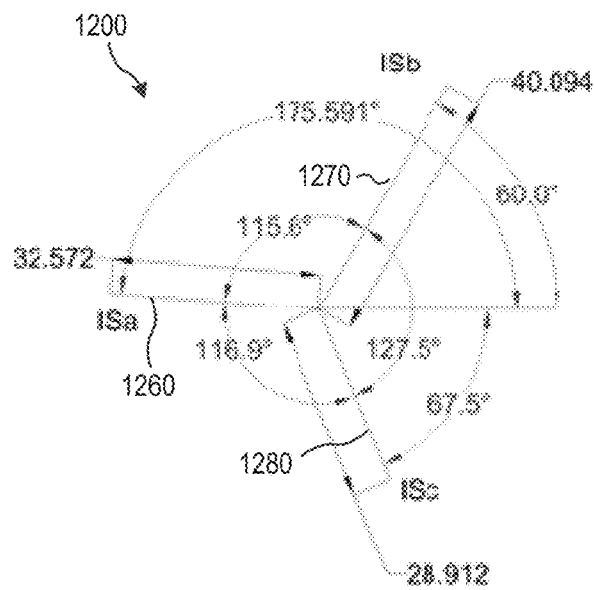
FIG. 12 is a representation of a STATCOM current used to balance the unbalanced power signal shown in FIG. 11, according to disclosed embodiments.

FIG. 12 is a representation 1200 of a STATCOM current used to balance the unbalanced power signal shown in FIG. 11, according to disclosed embodiments. As shown in FIG. 12, given the load current values in FIG. 11, and the load voltage values given above, the STATCOM output can be set as follows:

$$V_{SA}=831.384\angle 90°, \quad (29)$$

$$V_{SB}=831.384\angle -30°, \quad (30)$$

$$V_{SC}=831.384\angle 150°, \quad (31)$$

$$I_{SA}=I_{A\text{-}sum}-I_{LA}=32.572\angle 175.591°, \quad (32)$$

$$I_{SB}=I_{B\text{-}sum}-I_{LB}=40.094\angle 60°, \quad (33)$$

$$I_{SC}=I_{C\text{-}sum}-I_{LC}=28.912\angle -67.464°, \quad (34)$$

$$PF_S=0, \quad (35)$$

where $V_{SA}$, $V_{SB}$, and $V_{SC}$ are the STATCOM voltages for lines A', B', and C', respectively, where $I_{SA}$, $I_{SB}$, and $I_{SC}$ are the STATCOM currents for lines A', B', and C', respectively, and $PF_S$ is power factor for the STATCOM output.

The line current for the STATCOM 140 can be determined by the sum of the three individual STATCOM line currents:

$$I_{STATCOM} = I_{SA} + I_{SB} + I_{SC} \quad (36)$$
$$= 32.6 \, ang(175.591°) + 28.9 \, ang(-67.464°) +$$
$$40.094 \, ang(60°)$$
$$= 10.6 \, ang(97.3°)$$

The phase current can be determined by dividing the line current by $\sqrt{3}$.

Figure 13:
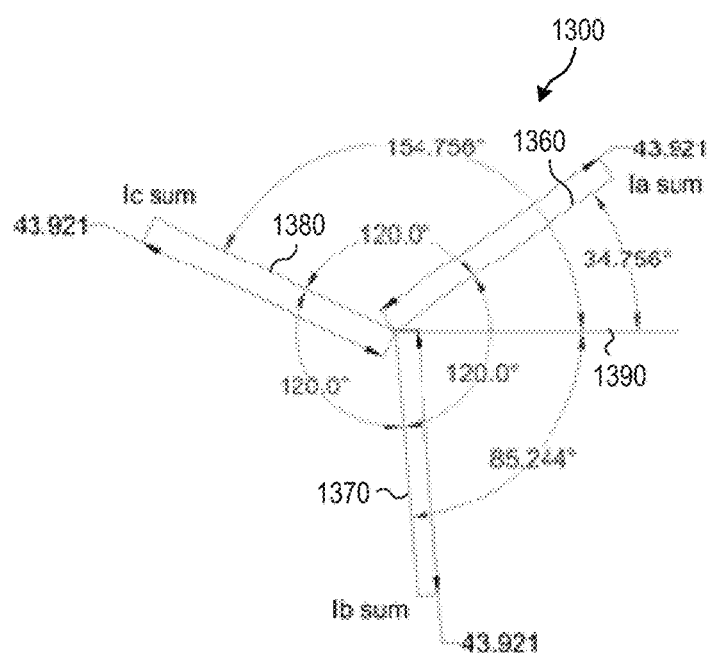
FIG. 13 is a representation of the sum of the load and STATCOM magnitudes, according to disclosed embodiments.

FIG. 13 is a representation 1300 of the sum of the load and STATCOM magnitudes, according to disclosed embodiments. In other words, FIG. 13 is the sum of the magnitudes of FIG. 11 and FIG. 12 Summing the load and STATCOM magnitudes yields the following balanced currents and voltage magnitudes:

$$V_{A\text{-}sum}=4239.245\angle 11.31°, \quad (37)$$

$$V_{B\text{-}sum}=4239.245\angle -108.69°, \quad (38)$$

$$V_{C\text{-}sum}=4239.245\angle 131.31°, \quad (39)$$

$$I_{A\text{-}sum}=43.921\angle 34.756°, \quad (40)$$

$$I_{B\text{-}sum}=43.921\angle -85.244°, \quad (41)$$

$$I_{C\text{-}sum}=43.921\angle 154.756°, \quad (42)$$

$$PF_{A\text{-}sum}=0.917, \quad (43)$$

$$PF_{B\text{-}sum}=0.917, \quad (44)$$

$$PF_{C\text{-}sum}=0.917, \quad (45)$$

where $V_{A\text{-}sum}$, $V_{B\text{-}sum}$, and $V_{C\text{-}sum}$ are the summed load and STATCOM voltages for lines A, B, and C, respectively, where $I_{A\text{-}sum}$, $I_{B\text{-}sum}$, and $I_{C\text{-}sum}$ are the summed load and STATCOM currents for lines A, B, and C, respectively, and $PF_{A\text{-}sum}$, $PF_{A\text{-}sum}$, and $PF_{A\text{-}sum}$ are the power factors for lines A, B, and C, respectively.

The final sum of the line current for the load 120 and the line current for the STATCOM 140 can be determined as follows:

$$I_{sum} = I_{line} + I_{STATCOM} \quad (46)$$

$$= 10.6\,ang(-82.7°) + 10.6\,ang(97.3°) = 0$$

The phase current can be determined by dividing the line current by $\sqrt{3}$.

Based on these equations, the apparent power $S_{A\text{-}sum}$, $S_{B\text{-}sum}$, $S_{C\text{-}sum}$, for lines A, B, and C, respectively, are:

$$S_{A\text{-}sum}=|V_{A\text{-}sum}|\cdot|I_{A\text{-}sum}|=186.19\times 10^3 \quad (47)$$

$$S_{B\text{-}sum}=|V_{B\text{-}sum}|\cdot|I_{B\text{-}sum}|=186.19\times 10^3 \quad (48)$$

$$S_{C\text{-}sum}=|V_{C\text{-}sum}|\cdot|I_{C\text{-}sum}|=186.19\times 10^3 \quad (49)$$

and the total apparent power $S_{sum}$ is:

$$S_{sum}=S_{A\text{-}sum}+S_{B\text{-}sum}+S_{C\text{-}sum}=558.57\times 10^3 \quad (50)$$

Based on the power factors given in Equations 41, 42, and 43, it is then possible to calculate the $P_{A\text{-}sum}$, $P_{B\text{-}sum}$, $P_{C\text{-}sum}$, for lines A, B, and C, respectively:

$$P_{A\text{-}sum}=S_{A\text{-}sum}\cdot PF_{A\text{-}sum}=170.817\times 10^3\angle 0° \quad (51)$$

$$P_{B\text{-}sum}=S_{B\text{-}sum}\cdot PF_{B\text{-}sum}=170.817\times 10^3\angle 0° \quad (52)$$

$$P_{C\text{-}sum}=S_{C\text{-}sum}\cdot PF_{C\text{-}sum}=170.817\times 10^3\angle 0° \quad (53)$$

and the total real power $P_{sum}$ is:

$$P_{sum}=P_{A\text{-}sum}+P_{B\text{-}sum}+P_{C\text{-}sum}=512.45\times 10^3\angle 0° \quad (54)$$

Thus, the current and voltage in the three-phase power system are balanced, although the power factor of the system is slightly reduced. This can be seen from the fact that the lowest angle of the resulting summation is 34.756°, rather than 0°. This shift in the angle of the summed current is indicative of the change in power factor from 0.95 to 0.917.

It should be noted that this example yields balanced currents from unbalanced currents. Voltage balancing can be achieved using the same principal.

Also, the control can be designed to adjust the currents into the given impedance of the line to achieve balanced voltages.

Using a STATCOM 140 with unbalanced phase angles to correct the magnitude imbalance it is possible to bring the voltages back into balance by allowing zero sequence and/or negative sequence currents to be present at the STATCOM 140.

Figure 14:
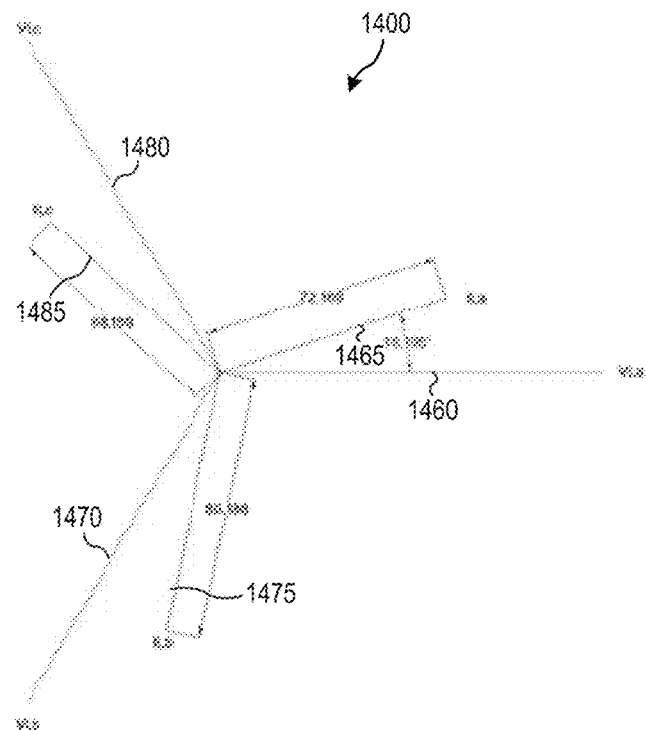
FIG. 14 is a representation of the vectors for the load current and the load voltage, according to disclosed embodiments.
Figure 15:
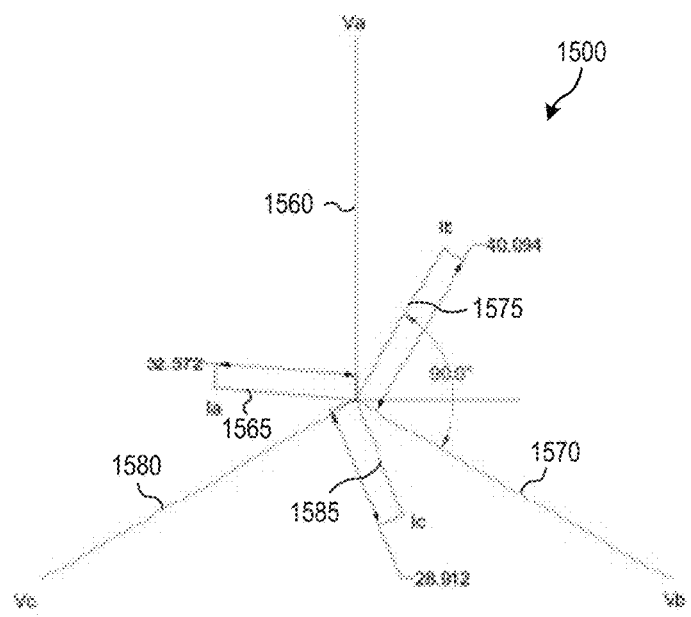
FIG. 15 is a representation of the vectors for the STATCOM current and the STATCOM voltage, according to disclosed embodiments.
Figure 16:
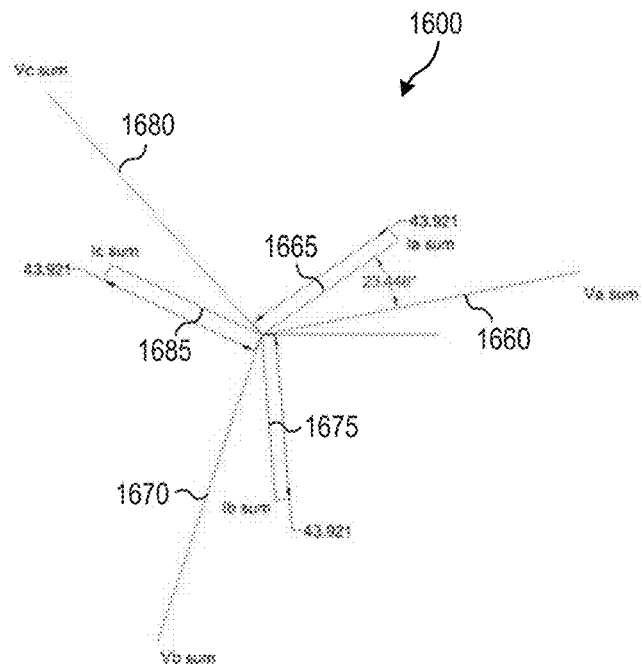
FIG. 16 is a representation of the vectors for the summed current and the summed voltage, according to disclosed embodiments.

In an effort to further describe the above process, FIG. 14 is a graph of the vectors for the load current and the load voltage, according to disclosed embodiments; FIG. 15 is a graph of the vectors for the STATCOM current and the STATCOM voltage, according to disclosed embodiments; and FIG. 16 is a graph of the vectors for the summed current and the summed voltage, according to disclosed embodiments.

As shown. FIG. 14, the load current vectors and the load voltage vectors include first, second, and third load current vectors 1465, 1475, 1485, corresponding to the currents on lines A, B, and C, respectively; and first, second, and third load voltage vectors 1460, 1470, 1480, corresponding to the voltages on lines A, B, and C, respectively.

As shown, FIG. 15, the STATCOM current vectors and the STATCOM voltage vectors include first, second, and third STATCOM current vectors 1565, 1575, 1585, corresponding to the currents provided on lines A', B', and C', respectively; and first, second, and third STATCOM vectors 1560, 1570, 1580, corresponding to the voltages provided on lines A', B', and C', respectively.

As shown. FIG. 16, the summed current vectors and the summed voltage vectors include first, second, and third summed current vectors 1665, 1675, 1685, corresponding to the summed currents on lines A, B, and C, respectively; and first, second, and third summed vectors 1660, 1670, 1680, corresponding to the voltages on lines A, B, and C, respectively.

As a result of the above arrangement, there is a ground current or additional phase currents (negative sequence currents and/or zero sequence currents) that are present and, can be accommodated by the STATCOM 140.

In particular, the negative sequence currents in the STATCOM 140 are:

$$I_A^2 = \frac{1}{3}(I_A + a^2 \cdot I_B + a^1 \cdot I_C) \quad (55)$$

$$= \frac{1}{3}(32.6\,ang(175.6°) + a^2 \cdot 28.9\,ang(-67.5°) + a^1 \cdot 40.1\,ang(60°))$$

$$= 74.8\,ang(175.2°),$$

$$I_B^2 = 74.8\,ang(-64.8°), \quad (56)$$

$$I_C^2 = 74.8\,ang(55.2°), \quad (57)$$

where $a^1=1\,ang(120°)$ and $a^2=1\,ang(-120°)$.

The zero sequence currents in the STATCOM 140 are:

$$I^0 = 32.6\,ang(175.6°) + 28.9\,ang(-67.5°) + a^1 \cdot 40.1\,ang(60°) \quad (58)$$
$$= 10.6\,ang(97.3°).$$

Thus, the STATCOM 140 will be subject to negative sequence currents/voltages and zero sequence currents/voltages, even if the source/load is not. However, the STATCOM 140 can be designed to withstand negative sequence currents/voltages and zero sequence currents/voltages.

Although the embodiment disclosed above is shown as balancing an unbalanced current, alternate embodiments can balance an unbalanced voltage using an analogous process.

STATCOM Controller

The controllers for this process can be on each individual phase to allow each phase to operate independently. However, a rotating frame controller can perform the same function and may be preferred.

Furthermore, a mathematical means may prove difficult in separating the load and the source current components. Because of this, an additional voltage and/or current measurement may be necessary at the line or load side of the utility line. Only two reference signals are necessary and the third can be calculated from the other two.

Figure 17:
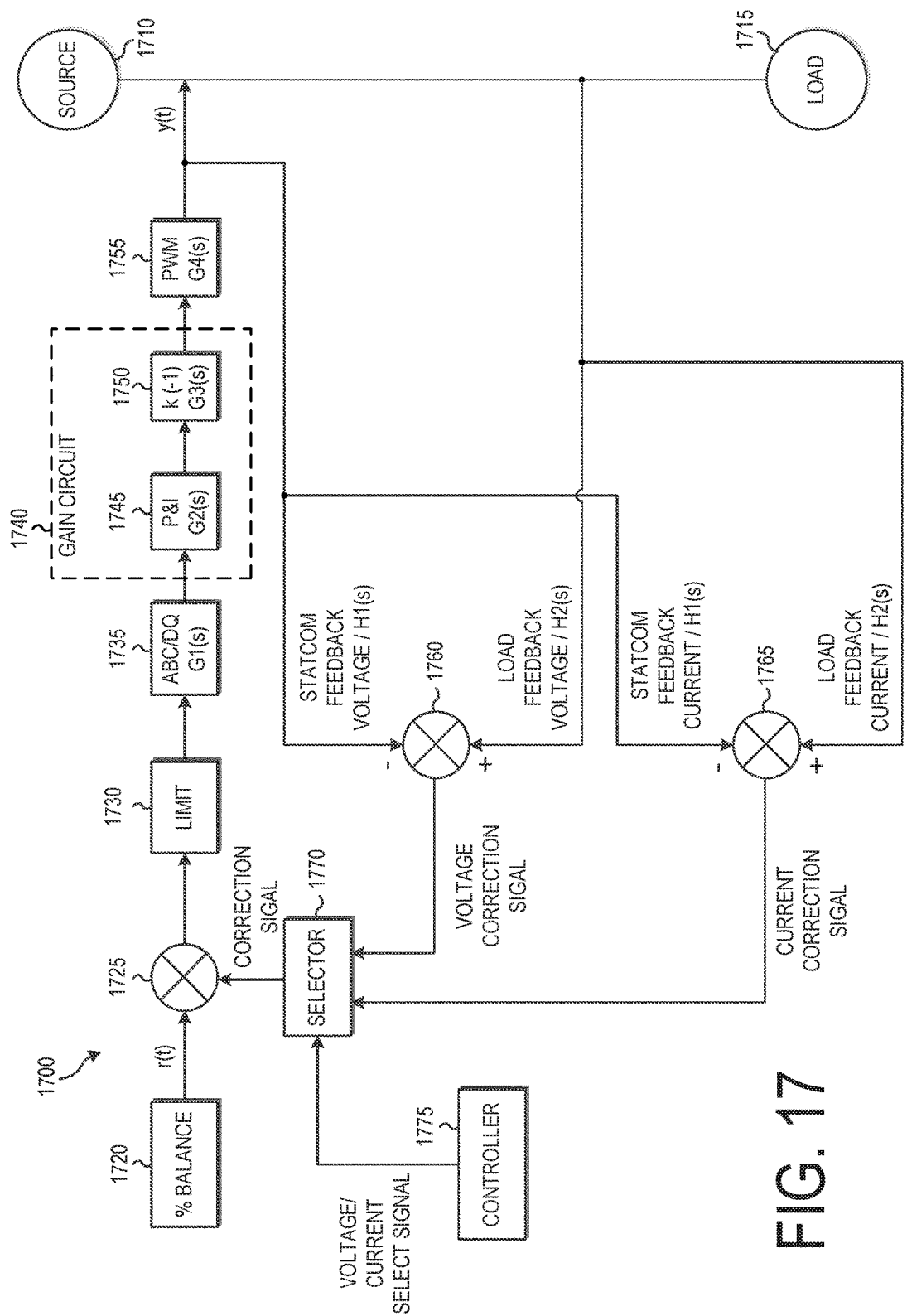
FIG. 17 is a control diagram of a circuit for balancing a load current and voltage in a three-phase power system, according to disclosed embodiments.

FIG. 17 is a control diagram of a circuit 1700 for balancing a load current and voltage in a three-phase power system, according to disclosed embodiments. As shown in FIG. 17, a source 1710 and a load 1715 are connected to the circuit 1700. The circuit 1700 includes a balance circuit 1720, a feedback mixer 1725, a limiting circuit 1730, a converter 1735, a gain circuit 1740, a pulse width modulator 1755, a voltage mixer 1760, a current mixer 1765, a selector 1770, and a controller 1775. The gain circuit 1740 further includes a proportional gain/integral gain circuit 1745 and an inverter 1750.

Although FIG. 17 discloses a single line connecting elements, it should be understood that it operates on the three lines of a three-phase power system. In some embodiments, the controllers can be on each individual phase to allow each phase to operate independently. In alternate embodiments, however, a rotating frame controller will perform the same function.

It should be noted that a mathematical means may prove difficult in separating the load and the source current components. Because of this an additional voltage and/or current measurement is necessary at the line or load side of the utility line. Only two reference signals are necessary, however, and the third can be calculated from the two.

The source 1710 is a three-phase power source that provides an unbalanced three-phase power signal to the load 1715.

The load 1715 is a device or devices that consume the power provided by the source 1710.

The balance circuit 1720 indicates system balance parameters, i.e. the limit of what the system can tolerate. For example, if the system can accommodate a 3% imbalance, the balance circuit 1720 will output a balance equation r(t) indicating this limit. Essentially, the balance equation r(t) indicates the minimum that the STATCOM 140 should correct to. For example, if the balance equation r(t) indicates a 3% imbalance tolerance, and the STATCOM 140 identifies a 5% imbalance on the lines between the source 110 and the drain 120, the STATCOM 140 would adjust the lines to have no more than a 3% imbalance.

The feedback mixer 1725 mixes the balance equation r(t) with a feedback signal received from the selector 1770, and provides this mixed signal to the limiting circuit 1730.

The limiting circuit 1730 operates to limit the correction value generated to be within the capabilities of the associated STATCOM 140. It will not allow the system to generate more current or voltage then the STATCOM 140 is designed to produce.

The converter 1735 operates to convert the incoming signal from the limiting circuit 1730 from one format to another. A function $G_1(s)$ would be a conversion function. For example, the converter 1735 could be an ABC/DQ converter to convert the incoming signal from an ABC format to a DQ format (i.e., performing a Park transformation on the signal). A Clark transformation can be performed as well in some embodiments. Other conversions are possible in different embodiments. In some embodiments the converter 1735 can be omitted entirely.

The gain circuit 1740 contains the proportional gain/integral gain circuit 1745 and the inverter 1750, and performs the functions of these elements. However, although in the disclosed embodiments the proportional gain/integral gain circuit 1745 is shown as coming before the inverter 1750, in alternate embodiments the position of these two elements can be reversed.

The proportional gain/integral gain (P and I gain) circuit 1745 performs a proportional gain/integral gain operation on an input signal. This proportional gain/integral gain operation could be represented as:

$$G_2(s) = K_p + \frac{K_i}{s}, \quad (59)$$

where $K_p$ is a proportional gain function, and $$\frac{K_i}{s}$$

is an integral gain function. Differential gain is not used. The purpose of the P and I gain operation is to allow the signal to rapidly respond to the error without overshooting the target or oscillating uncontrollably.

The inverter 1750 multiplies the incoming signal by −1 to invert its value. A function $G_3(s)$ would be the inversion function. This makes certain that the output value is a correction value that when added to the signals on the lines A, B, C will be of the proper sign to provide a balanced signal on the power lines.

The pulse width modulator 1755 performs pulse width modulation on the incoming signal. A function $G_4(s)$ would be a pulse width modulation function.

The voltage mixer 1760 determines a voltage feedback signal by subtracting a STATCOM feedback voltage $H_1(s)$ fed from the output of the STATCOM 140 from a load feedback voltage $H_2(s)$ fed from the power line.

The current mixer 1765 determines a current feedback signal by subtracting a STATCOM feedback current $H_1(s)$ fed from the output of the STATCOM 140 from a load feedback current $H_2(s)$ fed from the power line.

The selector 1770 selects either the voltage feedback signal provided from the voltage mixer 1760 or the current feedback signal provided from the current mixer 1765, depending upon whether the STATCOM 140 is correcting for voltage or current. In either case, the feedback signal will be $H_2(s)-H_1(s)$.

The controller 1775 controls the operation of the selector 1770, and therefore determines whether the STATCOM 140 will correct for current or voltage.

The operation of the circuit 1700 of FIG. 17 can be shown by the following equation:

$$\frac{Y(s)}{R(s)} = \frac{G_1 + G_2 + G_3 + G_4}{H_2 - H_1}. \tag{60}$$

Although this control scheme is provided by way of example, alternate control schemes can be employed. What is important is that the STATCOM 140 use feedback from the output of the STATCOM 140 and from the power lines to generate a correction signal that will balance out an unbalanced signal on the power lines.

Method of Operation

Figure 18:
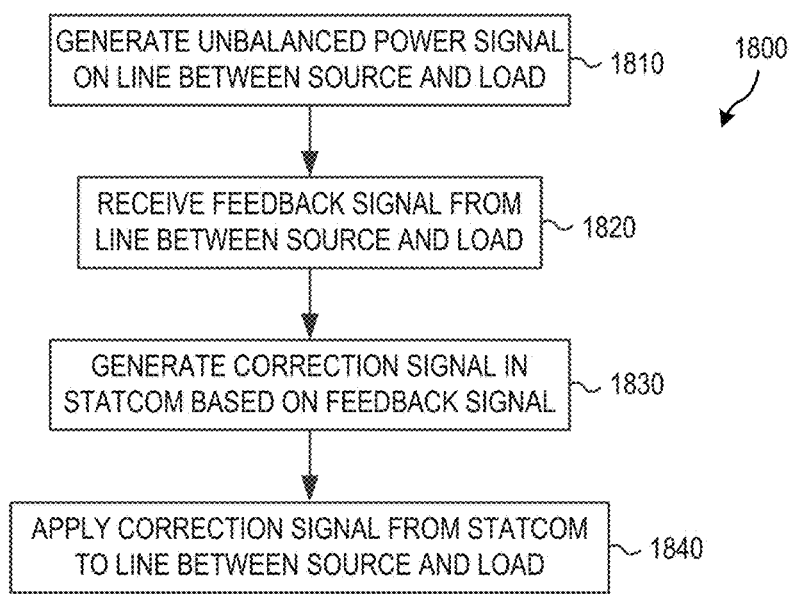
FIG. 18 is a flow chart showing a balancing operation in a three-phase power system, including a STATCOM, according to disclosed embodiments.

FIG. 18 is a flow chart showing a balancing operation 1800 in a three-phase power system, including a STATCOM, according to disclosed embodiments.

As shown in FIG. 18, operation begins when a source generates an unbalanced power signal on lines between the source and a load. (1810)

A control circuit then receives a feedback signal from the lines between the source and the load. (1820)

The control circuit then generates a correction signal in the STATCOM based on the feedback signal. (1830) This correction signal is formulated such that when added to the unbalanced power signal, a summed signal will be a balanced signal, as set forth above.

Finally, the control circuit applies be correction signal from the STATCOM to the lines between the source and the load. (1840)

Figure 19:
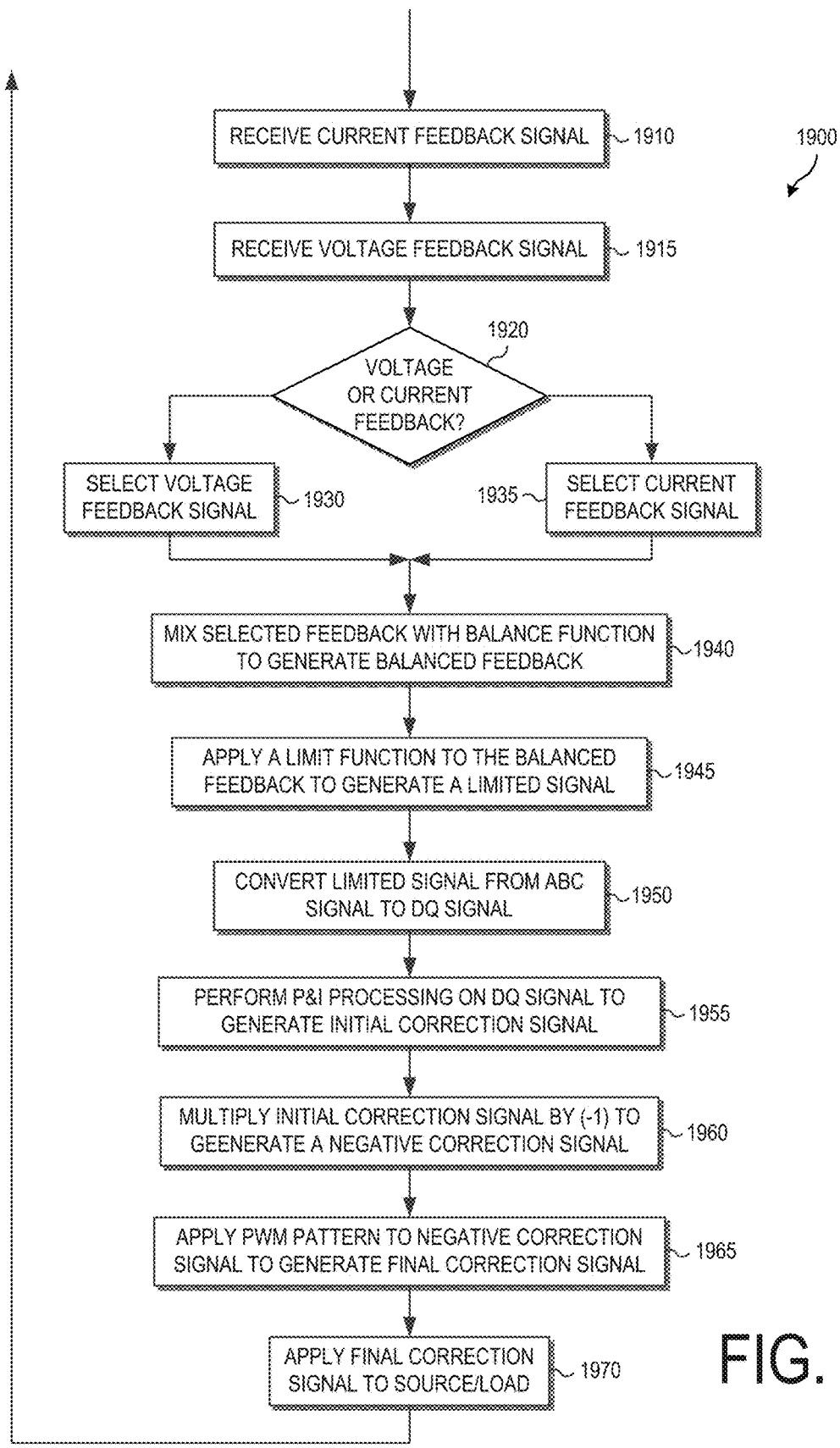
FIG. 19 is a flow chart showing a balancing operation in a three-phase power system, including a STATCOM, according to other disclosed embodiments.

FIG. 19 is a flow chart showing a balancing operation in a three-phase power system, including a STATCOM, according to other disclosed embodiments.

As shown in FIG. 19, operation begins when a feedback circuit receives current feedback signals. (1910) These current feedback signals can include feedback signals from three-phase power lines as well as feedback signals from the output of a STATCOM.

The feedback circuit also receives voltage feedback signals. (1915) These voltage feedback signals can include feedback signals from three-phase power lines as well as feedback signals from the output of the STATCOM.

Operations 1910 and 1915 can be performed in any order, and can also be performed simultaneously.

The feedback circuit then determines whether to select the voltage feedback or the current feedback. (1920) This decision is made to determine whether a current imbalance or a voltage in balance will be corrected. If the voltage feedback is selected, then a voltage imbalance is corrected, and if the current feedback is selected, then a current imbalance is corrected.

If the voltage feedback is selected, then the voltage feedback signal is set as the selected feedback. (1930) Similarly, if the current feedback is selected, then the current feedback signal is set as the selected feedback (1935)

The selection of the current feedback or the voltage feedback and the setting of the selected feedback can be performed by a control circuit in conjunction with a selector or multiplexer.

The selected feedback is then mixed with a balance function to generate a balanced feedback signal. (1940) This balance function indicates the degree to which a correction value must correct an imbalance in the three-phase power signal. For example, in the disclosed embodiment, the balance function might indicate that the correction value must correct the imbalance in the three-phase power signal to within 3% error.

The system then applies a limit function to the balanced feedback to generate a limited signal. (1945) This limit function serves to limit a final correction value to a physically achievable value based on the circuitry available for generating it.

The system then converts the limited signal from an ABC signal to a DQ signal. (1950) This can be achieved by applying a Park function to the limited signal. This function can be omitted in alternate embodiments in which later processing can process an ABC signal, or in which a DQ signal is provided at an earlier portion of processing.

The system then performs proportional gain/integral gain (P and I) processing on the DQ signal to generate an initial correction signal. (1955) The purpose of the P and I gain is to allow the signal to rapidly respond to the error without overshooting the target or oscillating uncontrollably.

The system then multiplies the initial correction signal by −1 to generate a negative correction signal. (1960) This inversion is performed so that the resulting correction signal will have the proper sign to properly correct the three-phase power signal.

In alternate embodiments, the P and I processing (1955) and the multiplication by −1 (1960) can be reversed in order.

A pulse width modulation (PWM) pattern is then applied to the negative correction signal to generate a final correction signal. (1965)

The final correction signal is then applied to the source/load to correct the three-phase power signal. The final correction signal should correct an unbalanced three-phase power signal into a balanced three-phase power signal. In other words, the sum of the final correction signal and the unbalanced three-phase power signal should be a balanced three-phase power signal.

This process then repeats so long as a correction value is necessary. Although FIG. 19 discloses that the various operations are repeated, they can in fact be performed continuously.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof when interpreted in accordance with the, breadth to which they are fairly, legally, and equitably entitled. The various circuits described above can be implemented in discrete circuits or integrated circuits, as desired by implementation.

What is claimed is:

1. A static synchronous compensator device connected between a source and a load of a three-phase power system, comprising:
   a main feedback line configured to provide a main feedback signal from lines between the source and the load;
   a mixer configured to mix the main feedback signal with a balance function to generate a balanced signal;
   a signal controller configured to convert the balanced signal to a controlled signal;
   a gain circuit configured to multiply the controlled signal by −1 and to perform proportional gain and integral gain (P & I) processing on the controlled signal to generate an intermediate correction signal; and
   a pulse width modulator configured to apply a pulse width modulation pattern to modulate the voltage source inverter to generate an AC waveform that is applied to the lines between the source and the load.

2. The static synchronous compensator device of claim 1, wherein
   the signal controller is an ABC/DQ convertor configured to perform an ABC/DQ conversion, and
   the controlled signal is a DQ signal.

3. The static synchronous compensator device of claim 1, further comprising:
   a limiting circuit, located between the mixer and the signal controller, configured to perform a limiting function on the balanced signal, the limiting function being a function that limits a current and voltage of the balanced signal to a maximum current and voltage, respectively.

4. The static synchronous compensator device of claim 1, further comprising
   a voltage feedback line configured to provide a voltage feedback signal from the lines between the source and the load;
   a current feedback line configured to provide a current feedback signal from the lines between the source and the load; and
   a selector configured to select one of the voltage feedback signal and the current feedback signal as the main feedback signal in response to a voltage/current selection signal.

5. The static synchronous compensator device of claim 4, further comprising
   a voltage feedback mixer configured to subtract a static synchronous compensator voltage feedback signal from a load voltage feedback signal to generate the voltage feedback signal.

6. The static synchronous compensator device of claim 4, further comprising
   a current feedback mixer configured to subtract a static synchronous compensator current feedback signal from a load current feedback signal to generate the current feedback signal.

7. The static synchronous compensator device of claim 1, wherein
   the main processor is further configured to generate a three-phase correction voltage as the intermediate correction signal such that the summation of the three-phase correction voltage and an unbalanced voltage between the source and the load is a balanced voltage.

8. A method of phase balancing a three-phase power system, comprising:
   receiving a main feedback signal from an unbalanced power signal on a line between a source and a load;
   generating a correction signal in a static synchronous compensator (STATCOM) based on the main feedback signal where magnitudes of the correction signal are adjusted and angles of the correction signal are balanced such that the correction signal will result in a zero summation with an error signal, the error signal being the difference between a balanced power signal and the unbalanced power signal;
   applying the correction signal from the STATCOM to the line between the source and the load so that that the correction signal will balance the magnitudes of the unbalanced power signal and adjust the angles of the unbalanced power signal such that the error signal will be zero,
   wherein the summation of the unbalanced power signal and the correction signal is a balanced power signal.

9. The method of claim 8, wherein
   the main feedback signal is one of a voltage feedback signal or a current feedback signal.

10. The method of claim 8, wherein the operation of receiving a main feedback signal further comprises:
    obtaining a voltage feedback signal;
    obtaining a current feedback signal;
    selecting one of the voltage feedback signal and the current feedback signal as the main feedback signal.

11. The method of claim 8, wherein the generation of the correction signal further comprises
    generating a three-phase correction voltage such that the summation of the three-phase correction voltage and an unbalanced voltage in the unbalanced power signal is a balanced voltage.

12. The method of claim 8, wherein the generation of the correction signal further comprises
    generating a three-phase correction current such that the summation of the three-phase correction current and an unbalanced current in the unbalanced power signal is a balanced current.

13. A method of phase balancing a three-phase power system, comprising:
    obtaining a main feedback signal from lines connecting the source and load of the three-phase power system;
    mixing the main feedback signal with a balancing function to generate a balanced feedback;
    applying a limit function to the balanced feedback to generate a limited signal that is limited to a set current or voltage maximum;
    processing and inverting the limited signal to generate an intermediate corrections signal;
    applying a pulse wave modulation pattern to the intermediate correction signal to generate a final correction signal; and
    applying the final correction signal to the lines connecting the source and load of the three-phase power system,
    wherein the summation of the final correction signal and an unbalanced power signal on the lines between the source and the load is a balanced power signal.

14. The method of claim 13, further comprising:
    performing a DQ conversion operation on the limiting signal before sending the limiting signal to processing and inverting the limited signal to convert the limited signal into a DQ format.

15. The method of claim 13, wherein the operation of processing and inverting includes performing proportional gain and integral gain (P & I) processing on the limiting signal to generate an initial correction signal; and multiplying the intermediate correction signal by −1 to generate the intermediate correction signal.

16. The method of claim 13, further comprising:
obtaining a voltage feedback signal from the lines connecting the source and load;
obtaining a current feedback signal from the lines connecting the source and load; and
selecting one of the voltage feedback signal and the current feedback signal as the main feedback signal.

17. The method of claim 16, wherein the operation of obtaining a voltage feedback signal further comprises:
obtaining a static synchronous compensator (STATCOM) voltage feedback signal from a STATCOM;
obtaining a load voltage feedback signal from the lines connecting the source and load; and
subtracting the STATCOM voltage feedback signal from the load voltage feedback signal to generate the voltage feedback signal.

18. The method of claim 16, wherein the operation of obtaining the current feedback signal further comprises:
obtaining a static synchronous compensator (STATCOM) current feedback signal from a STATCOM;
obtaining a load current feedback signal from the lines connecting the source and load; and
subtracting the STATCOM current feedback signal from the load current feedback signal to generate the current feedback signal.

19. The method of claim 13, wherein the P&I processing further includes
generating a three-phase correction voltage such that the summation of the three-phase correction voltage and an unbalanced voltage in the unbalanced power signal is a balanced voltage.

20. The method of claim 13, wherein the P&I processing further includes
generating a three-phase correction current such that the summation of the three-phase correction current and an unbalanced current in the unbalanced power signal is a balanced current.

* * * * *